May 19, 1959 E. V. HARDWAY, JR 2,887,172
WELL LOGGING METHODS AND APPARATUS
Filed Nov. 30, 1953 3 Sheets-Sheet 1
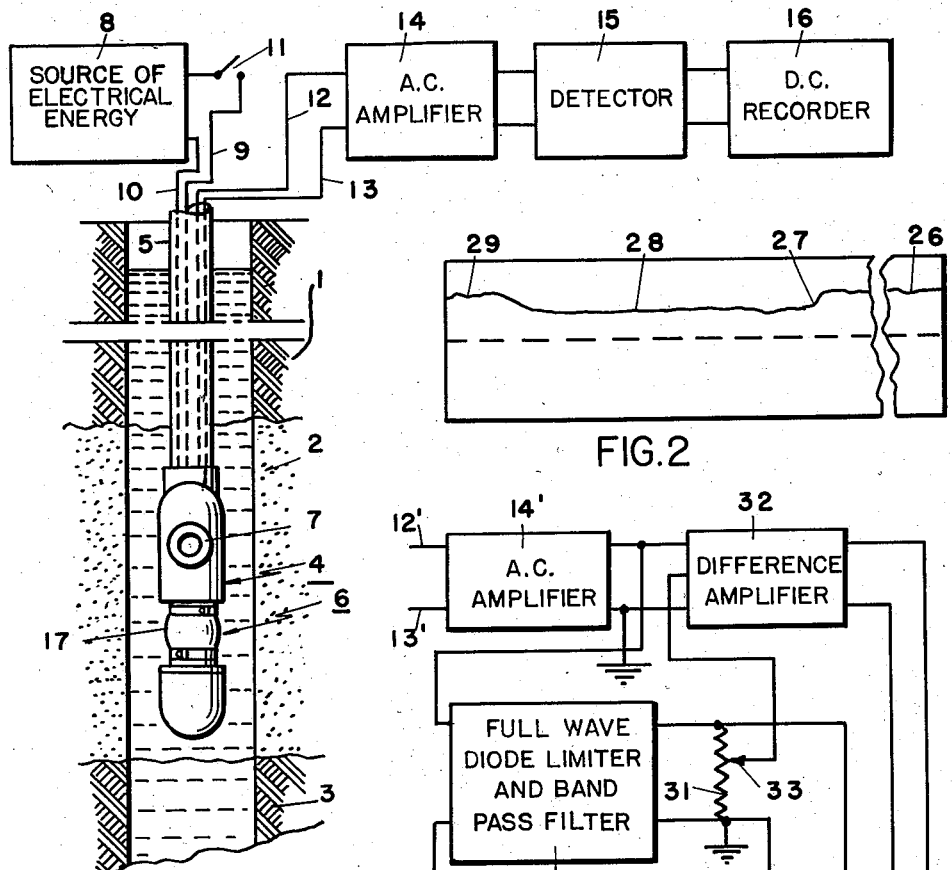
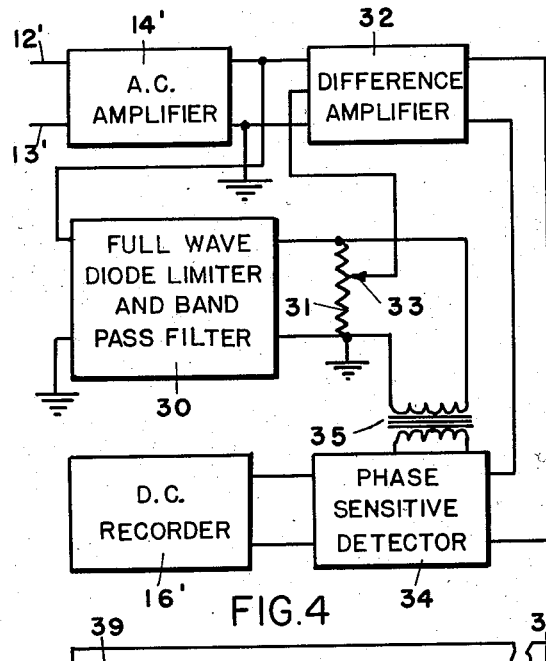
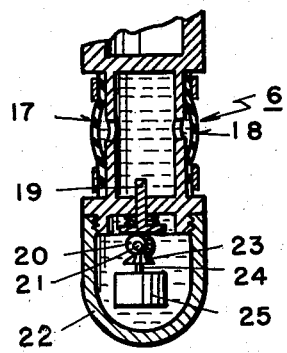
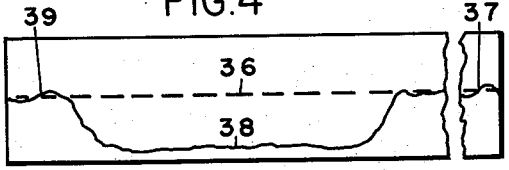
INVENTOR.
EDWARD V. HARDWAY, JR.
BY
Stone, Boyden & Mack
ATTORNEYS

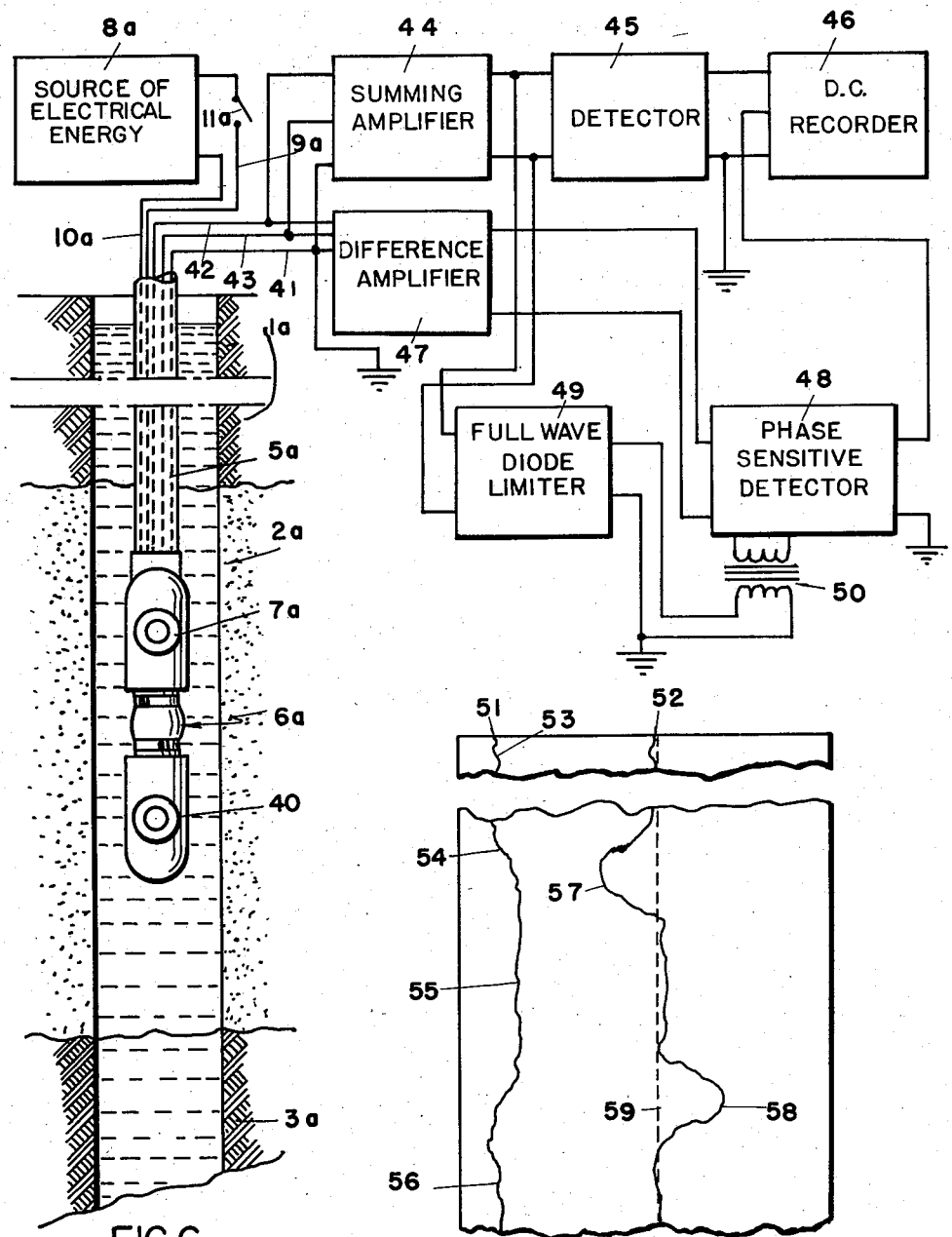

INVENTOR.
EDWARD V. HARDWAY, JR.
BY
*Stone, Boyden & Mack*
ATTORNEYS

United States Patent Office 2,887,172
Patented May 19, 1959

2,887,172

WELL LOGGING METHODS AND APPARATUS

Edward V. Hardway, Jr., Richmond, Va., assignor, by mesne assignments, to Robertshaw-Fulton Controls Company, Greensburg, Pa., a corporation of Delaware Application November 30, 1953, Serial No. 395,006

5 Claims. (Cl. 181—.5)

The present invention relates to well logging methods and apparatus, and, more particularly, to methods and apparatus for obtaining indications of the permeability or perviousness and characteristic acoustic impedance of strata traversed by a borehole.

It is well known that the relative permeability or perviousness of a formation, that is, the relative ability of the formation to conduct fluids under a pressure gradient, is a major factor in determining whether the formation is likely to be oil-producing. It is also known that marked changes in the characteristic acoustic impedance between adjoining strata, if determined, can be correlated with seismic reflection data obtained at the surface. Generally, formations which are more permeable will also have a lower characteristic impedance because of their lower density. Consequently, many methods and apparatus have been designed to obtain direct or indirect indications of the relative permeability and acoustical properties of strata traversed by boreholes. Such indications are often obtained by sinking various types of exploring tools into the borehole and through formations whose characteristics are to be determined. The most significant and most pertinent to the present invention of the methods and apparatus of the prior art include a continuous wave or pulse sound emitter which is lowered within the borehole on a cable or some other suitable suspending means, and a receiver or a plurality of receivers which may also be lowered within the borehole on the suspending cable. The methods utilized in the past with apparatus of this broad description have usually consisted of measurements of the transit time of the vibrations between the emitter and one or more receivers, or measurements of the absorption of high frequency energy transmitted over appreciable distances in a borehole.

All of the prior art methods, unfortunately, have been subject to very strong objections, particularly where the object is to obtain information as to perviousness of the strata or changes in acoustic impedance likely to produce seismic reflections. Their results have been, in many cases, rather poor indications of either the permeability or impedance of the medium in which the measurements have been taken, and the graphs or other indications obtained by such methods often have been difficult to interpret and correlate to the structure of the borehole traversed by the well logging apparatus. Some of the causes of deficiencies in the prior art methods and apparatus have been found to be the following: the transit time or velocity of vibrations between a transmitter and a receiver is not simply related to the impedance of the strata through which the vibrations travel, and, in some instances, density differences are found which do not cause a change in velocity or transit time; and, the absorption of high frequency energy over appreciable distances between transmitters and receivers within a borehole is subject to many variables other than the permeability of the structure traversed, so that it is difficult to obtain data directly indicative of the permeability of the strata, and it is difficult to indicate with any degree of accuracy the exact location of the region in which the permeability changes.

The methods and apparatus of the present invention have been designed to take advantage of the good features of the radiation impedance measuring method but to avoid the difficulties and disadvantages previously experienced with that method. Inasmuch as impedance is the ratio of pressure to velocity, the radiation impedance of the body of liquid near a source of periodic pulsations of constant volume velocity amplitude may be determined by measuring the resulting pressure fluctuations in the liquid at a point near the source. It can be seen that with such an arrangement the pressure will be greater if the energy is confined to the borehole than it will be if much of the energy escapes to surounding strata. Accordingly, the apparatus of the present invention provides an emitter of pulsations of substantially constant volume velocity and frequency in which the volume velocity is independent of hydrostatic or dynamic pressures, and at least one pressure-sensitive receiver or transducer located within the borehole near the source of pulsations. It has been found that if the receiver is displaced from the source of pulsations by a distance smaller than a quarter wavelength of the pulsations, no difficulty is encountered by changing phase of the pulsations caused by reflections and discontinuities. With the same object in view, the frequency of the pulsations is selected so that the wavelength of the pulsations is at least greater than four times the borehole diameter.

It has been found advantageous to use as a source or emitter of volumetric pulsations a container whose volume is varied by a reciprocating piston. The container may have a resilient wall which will translate volume changes of the container into pressure fluctuations in the liquid surrounding the container. The term volume velocity amplitude will be understood to be the peak velocity of the reciprocating piston multiplied by the area of the piston. The emitter is so designed that the volume velocity amplitude is maintained constant. If the pulsations supplied by the emitter are sinusoidal, the term "constant volume velocity amplitude" is equivalent to "constant volumetric displacement and frequency." In other words, when the pulsations are sinusoidal, the volume of liquid displaced by the emitter during each half cycle is maintained constant and the frequency is maintained constant, in order that changes in radiation impedance will be directly indicated by changing amplitudes of pressure fluctuations. Though the emitter of the present invention preferably supplies sinusoidal volumetric pulsations, it is not necessary that the pulsations be sinusoidal for the operation of the invention.

It has been found particularly advantageous to use a pair of pressure-sensitive receivers located at opposite sides of the emitter. The pressure fluctuation signals obtained from the two receivers can then be subtracted to yield a clear indication of changing characteristics of the surrounding formations, and the signal obtained by subtracting the signal outputs of the two receivers can be compared with a reference signal to enable detection of the direction of change of the permeability at the area in which the permeability is changing. This method of subtraction permits complete cancellation of all unwanted signal, such as that from sound transmitted through the exploring tool, and permits balancing when the emitter and both receivers are in uniform strata. It also has been found advantageous to amplify the voltage of the signal from the receiver or receivers to supply the voltages through appropriate amplifying and detecting means to a D.-C. recorder which provides a continuous indication on a moving chart of the relative acoustical properties of the rock formation through which the emitter and receiver are moved. The advance of the recorder chart and the vertical motion of the transmitter and receiver may be so correlated that the resulting record is related to the depth at which the tool is located.

Preferred embodiments of the apparatus and methods of the present invention will be described in conjunction with the accompanying drawings, though the invention is not to be considered limited to the embodiments specifically described in the following subject matter, since the apparatus and methods described constitute merely preferred embodiments of the invention.

In the drawings,

Fig. 1 is a schematic showing of a borehole and rock formations traversed by the borehole, together with apparatus of one embodiment of this invention;

Fig. 2 is an illustration of a graph which would be obtained by use of the apparatus of Fig. 1 in conjunction with the formations shown in Fig. 1;

Fig. 3 is a vertical sectional view through a transmitter or emitter which may be utilized with the apparatus of the invention;

Fig. 4 is a schematic diagram of a portion of the electrical apparatus of a modification of the apparatus of Fig. 1;

Fig. 5 is an illustration of a typical graph which would be obtained with the apparatus of Fig. 4;

Fig. 6 is a schematic view of a borehole, rock formations traversed by the borehole and apparatus of another embodiment of the present invention;

Fig. 7 is an illustration of a graph which would be obtained with the apparatus of Fig. 6 when utilized in rock formations similar to those shown in Fig. 6;

Figure 8:
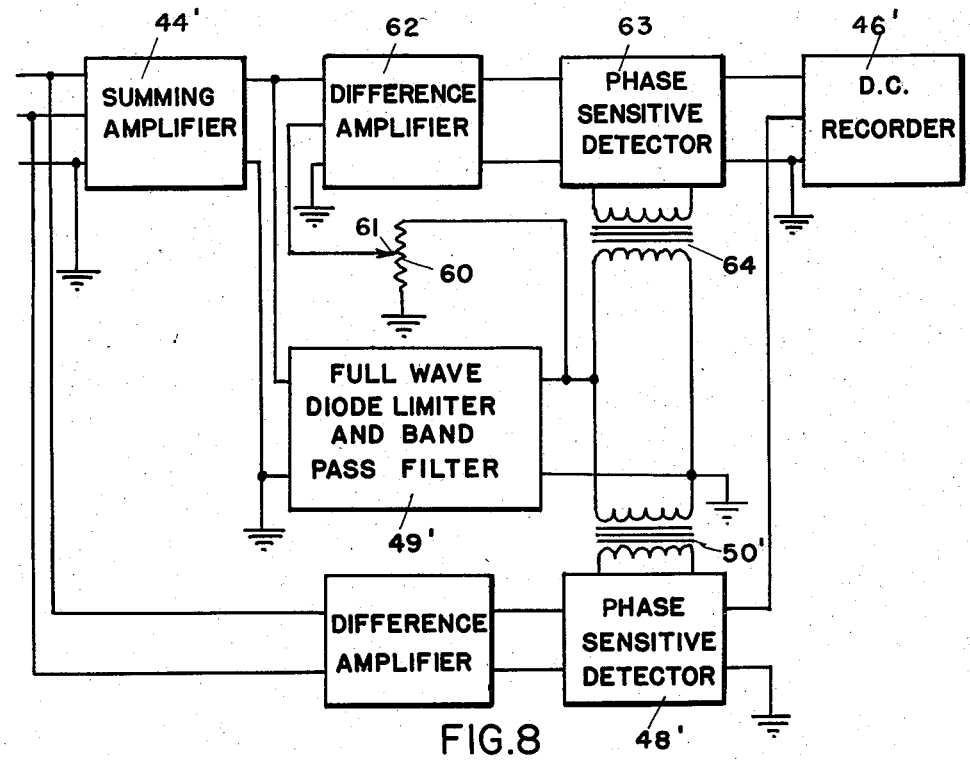
Fig. 8 is a schematic diagram of a portion of the electrical apparatus of a modification of the apparatus of Fig. 6.

In the apparatus of Fig. 1, typical rock formations which might be traversed by a liquid-filled borehole are shown as including a relatively impermeable formation 1, a more permeable formation 2, and a second relatively impermeable formation 3. A well logging tool 4 is suspended within the borehole by means of a multiconductor cable 5 which may be raised and lowered within the borehole by means of conventional design located at the ground level or surface (not shown). The well logging tool 4 includes a transmitter or emitter 6 which is designed to emit volumetric pulsations of a relatively low, constant frequency and of substantially constant amplitude into the liquid within the borehole. The frequency of the pulsations is selected so that the borehole diameter is smaller than a quarter wavelength of the pulsations. The transmitter or emitter 6 may be of several different constructions, but a transmitter designed to comply with the specifications set up for the transmitter of the present invention will be described in conjunction with Fig. 3 of the drawings.

The well logging tool 4 also includes a receiver 7 which may comprise any suitable pressure-sensitive transducer designed to translate pressure pulsations impinging on it into A.-C. electrical voltages of amplitudes representative of the magnitude of the pulsations received. The receiver may be electrokinetic, containing a cell constructed as shown in my Patents Numbers 2,644,900 and 2,644,902, issued July 7, 1953, or in my copending application Serial Number 258,493, filed November 27, 1951, now Patent Number 2,661,430, issued December 1, 1953. The receiver 7 is mounted in the logging tool a short distance from the transmitter or emitter 6, and the distance between the emitter and receiver is less than a quarter wavelength of the pressure pulsations supplied by the emitter.

A source of electrical power 8 is provided to energize the emitter 6 and is located at the ground level. The electrical source is connected to the emitter by means of conductors 9 and 10, and a switch 11 is provided to control the energization of the emitter. The conductors 9 and 10 are contained within the multiconductor cable 5. The receiver or transducer 7 is connected by conductors 12 and 13 within the cable 5 to a suitable A.-C. amplifier 14. The output terminals of the amplifier 14 are connected to a detector 15, and the rectified D.-C. signal at the output of the detector is supplied to a D.-C. recorder 16. The amplifier, detector, and recorder are of any suitable conventional design, so that their structures will not be more fully described herein, since their specific constructions do not form parts of this invention. The recorder 16 is designed to impress an indication of the rectified signal received by it on a chart which moves in correspondence with movement of the logging tool through the borehole. The transverse position of the indication on the chart is determined by the magnitude of the signals supplied the recording head of the recorder.

Referring to Fig. 3, the emitter or transmitter 6 may comprise a liquid-filled container or bulb 17 having a resilient outer wall 18 adapted to be deflected inwardly and outwardly by volume changes within the bulb. A piston 19 projecting into the bulb 17 is designed to be reciprocated by a cam 20 rotatable by rotation of a shaft 21 mounted in a lower housing 22. The shaft 21 is rotated through gearing 23 by the shaft 24 of a sealed electric motor 25. Lower housing 22 is liquid filled, and preferably oil-filled, to enable it to withstand high hydrostatic pressures. Hydrostatic pressures are equalized by slow leakage of liquid past the piston, such leakage being negligible insofar as it affects the pulsations produced. The motor 25 is preferably a D.-C. type to make it unnecessary to transmit high level A.-C. energy down the signal cable 5. Internal compliance is provided by the compressibility of the volume of oil in the housing 22 so that operation of the motor is not interfered with, even by the large pressures met at great depths. Energy for operation of the electric motor is supplied, as above explained, from power source 8 through conductors 9 and 10, under control of the power switch 11.

When power switch 11 is closed, energy is provided to rotate the shaft 24 of the motor 25, which, through gearing 23, causes rotation of cam 20, thus resulting in reciprocatory motion of piston 19. Reciprocatory motion is translated into volume change pulsations of the liquid contained within the bulb 17, and these pulsations of this liquid cause displacement inwardly and outwardly of the resilient wall 18. These volume displacements of the resilient wall are transmitted to the borehole liquid and produce a pulsating pressure sensed by transducer 7.

If the rock formation surrounding the logging tool 4 were highly impermeable to acoustic vibrations, all of the energy of these vibrations would be constrained to escape up or down the borehole, and a certain level of pressure from the emitter 6 would be picked up by the receiver 7. However, all rock formations are somewhat permeable to acoustic vibrations, so that some of the energy of the pulsations transmitted from the emitter 6 is lost in the surrounding formations, thus lowering the pressure sensed by transducer 7. The relative acoustic impedance of the formation determines how much of the pulsations' energy is lost through the surrounding formation and, therefore, how much of the energy from the emitter is picked up by the receiver. Since the level of fluctuating pressure picked up by the receiver is, then, a measure of the radiation impedance presented to the body of liquid in the borehole in proximity to the emitter and receiver, the measurement of the pressure level at the receiver provides an indication of the characteristic impedance of the formation surrounding the logging tool.

Operation of the apparatus of Figs. 1 and 3 can be understood from an examination of those figures in conjunction with the graph of Fig. 2. Pressure pulsations received by the transducer or receiver 7 are translated into A.-C. voltage variations which are transmitted through conductors 12 and 13 to the amplifier 14. Amplifier 14 increases the amplitude of the A.-C. voltage from the receiver and supplies it to a detector 15. The detector rectifies the amplified voltages and supplies a D.-C. voltage of varying amplitude to the recording head of recorder 16. The variations in D.-C. voltage are responsive to variations in the effective value of the A.-C. receiver voltage. The recording head of the recorder provides a graph such as shown in Fig. 2 on the chart of the recorder. When the logging tool passes through the relatively impermeable formation 1, an output level such as shown at 26 is indicated on the graph. When the logging tool passes the boundary between the rock formations 1 and 2, the level indicated on the graph drops rather abruptly, as shown at 27, because of the changing permeability of the formations surrounding the logging tool at this level. The lower level of impedance met while the logging tool is passing through the relatively permeable formation 2 is indicated at 28 on the graph, and it will be seen that the impedance level once more increases as the logging tool passes through the boundary between the formations 2 and 3. The increased level of pressure is shown at 29 on the graph of Fig. 2.

Though the apparatus of Fig. 1 provides an excellent indication of the permeability of the formations through which the logging tool is moved, it is subject to some objection because the recording head is supplied with a voltage indicative of the total energy picked up by the receiver. Though the amplitude of the total energy is not so great that the changes in energy level caused by change in radiation impedance or formation permeability cannot be easily seen, as indicated in Fig. 2, it would be preferable if an average or datum level could be provided for the graph of Fig. 2 and small excursions from that level more readily noted. If a datum voltage could be subtracted from the voltage obtained from the receiver before that voltage was supplied to the recorder, the recorder, which may contain a D.-C. amplifier, would only indicate differences between the received signal amplitude and the datum level, and the D.-C. bias setting of the recorder necessary when total levels were measured would not be necessary. The difficulties of balancing high level D.-C. outputs are well known. Accordingly, a portion of the apparatus of Fig. 1 is shown as modified in Fig. 4 to remedy the objections to the apparatus of Fig. 1. This modified apparatus is designed to supply a comparison voltage for the signal output of the receiver, and the comparison voltage is obtained from the receiver output signal.

In Fig. 4, the conductors and the amplifier are identical with the corresponding elements of Fig. 1 and are indicated with the same numerals, primed. However, the output voltage from the amplifier 14' is supplied to the input of a limiter 30. The limiter is designed to derive from the varying amplitude A.-C. voltage obtained from the amplifier, a constant amplitude A.-C. voltage of the same frequency and phase as the voltage at the output of the amplifier. The limiter may utilize a full wave diode circuit of a type well known in the art and may contain a bandpass filter to substantially eliminate harmonic frequencies arising in the limiter. The output voltage of the limiter, which might be termed a reference voltage, is connected across a potentiometer 31. A difference amplifier 32 receives the output voltage from the amplifier 14' and the voltage from the limiter 30 and provides an output signal proportional to their difference. The amplitude of the voltage to be supplied to the difference amplifier 32 is selected by movement of a tap 33 on the potentiometer, so that the amplitude of the limited signal and hence the amplitude of the difference between the limited signal and the signal from amplifier 14' can be adjusted to zero for a known formation. The voltage obtained from the potentiometer tap might be termed a comparison voltage to distinguish from the reference voltage across the entire potentiometer. The voltage output of the difference amplifier 32 is connected to the input of a phase-sensitive detector 34 which also receives the reference voltage from the output of the limiter 30, through the medium of a transformer 35. The phase-sensitive detector compares the phases of the reference voltage and the difference voltage from the difference amplifier 32 and supplies to the recording head of the recorder 16' a D.-C. voltage of amplitude corresponding to the difference between the output level of the A.-C. amplifier 14' and the comparison voltage obtained from the potentiometer tap 33 and of polarity determined by the relative phase of the output of the difference amplifier 32 with respect to the reference voltage from limiter 30.

Limiter 30, difference amplifier 32 and phase-sensitive detector 34 are of any suitable and conventional design, and since their specific constructions do not form a part of this invention, they will not be described in detail.

The operation of the apparatus of Figs. 1 and 3, as modified in accordance with the showing of Fig. 4, can be seen from the graph of Fig. 5. On the graph of Fig. 5, the dashed line 36 indicates the reference level selected by the movable tap on the potentiometer 31. The energy level indicated at 37 indicates passage of the logging tool through a relatively impermeable formation, such as at 1 in Fig. 1, while the level indicated at 38 indicates passage through a permeable formation, such as at 2 in Fig. 1, and the level 39 indicates passage through another impermeable formation such as 3 in Fig. 1.

It is evident that since the comparison and reference voltages are obtained from the signal itself all unwanted signal can be readily rejected through proper filtering and phasing of the subtracted voltages, regardless of their source.

While the apparatus of the foregoing figures yield satisfactory indications of permeability of rock formations surrounding the borehole through which a logging tool is moved, it has been found that more conspicuous results can be obtained when two receivers are used, rather than the one receiver disclosed in conjunction with the foregoing figures. In Fig. 6 an apparatus is shown which includes, in addition to the apparatus disclosed in Fig. 1, a second receiver or transducer identified at 40 in that figure. The well logging tool is otherwise similar to that of Fig. 1, and the cable and power supply and several of the conductors of the apparatus of Fig. 6 are likewise similar to those corresponding elements of Fig. 1 and have been identified with the same numerals utilized in Fig. 1 with the subscript "a." The elements of Fig. 6 which are identical with elements of Fig. 1 consequently will not be further described in conjunction with Fig. 6.

The receiver or transducer 40 of Fig. 6 may be identical with receiver 7a of Fig. 1. Though the cable 5a may contain two conductors for each of the two receivers 7a and 40, it is convenient to provide only three conductors for the outputs of the two receivers and to ground one of these three conductors, the grounded conductor being identified at 41 in Fig. 6. The other two conductors are each connected to one terminal of the output of one of the two receivers, and the second terminal of the output of each of the receivers is grounded. The conductors connected to the ungrounded terminals are identified at 42 and 43. The electrical voltage outputs of the two receivers 7a and 40 are supplied to a summing amplifier 44, which adds the voltages from the two receivers together, amplifies them, and yields a voltage representative of the sum of the voltages from the two receivers. The output voltage from summing amplifier 44 is supplied to a detector 45 which rectifies the voltage output of the amplifier and provides at its output a D.C. voltage of amplitude representative of the sum of the voltage outputs of receivers 7a and 40, The output voltage of the detector 45 is supplied to one recording head of a dual-recording-head D.C. recorder 46. The recording head to which the voltage from detector 45 is supplied provides an indication on a movable chart of the value or amplitude of the voltage obtained from the detector, which in turn is representative of the sum of the two voltages obtained. Consequently, the indication on the recorder chart is proportional to the average of the voltages obtained from the two receivers. The summing amplifier 44, the detector 45, and the recorder 46 may be of any conventional construction designed to provide the results attributed to them in the foregoing description. Since their specific constructions are not part of this invention, they will not be described in further detail.

The voltage outputs of receivers 7a and 40 are also connected through conductors 41 through 43 to a difference amplifier 47 which provides at its output terminals an amplified voltage indicative of the difference between the voltages obtained from receivers 7a and 40. The output voltage from the difference amplifier 47 is supplied to a phase-sensitive detector 48. Phase-sensitive detector 48 is designed to yield an output voltage indicative in amplitude of the voltage output of the difference amplifier 47 and having a polarity dependent on which of the two voltages obtained from receivers 7a and 40 is the greater. In order to obtain this polarity representation from phase-sensitive detector 48, a second, or reference, voltage is supplied to the detector from a limiter 49. Limiter 49 may be a full wave diode limiter of a type well known to the art and may obtain its input from the output of the summing amplifier 44. The limiter provides at its output an A.C. voltage of substantially constant amplitude and of the same frequency and phase of the voltages obtained from the two receivers. The limiter may also contain a bandpass filter of a type well known in the art, in which the bandpass response of the filter includes the frequency of the pulsations emanating from the emitter 6a. The output voltage from the limiter 49 is supplied to the primary of the transformer 50 whose secondary is connected to the phase-sensitive detector. The output of the phase-sensitive detector 48 is supplied to the second recording head of D.C. recorder 46. The recording heads of the recorder apply two displaced lines to the moving chart of the recorder.

Referring to Fig. 7, the operation of the apparatus of Fig. 6 may be understood by reference to the two graphs formed by the recorder. The line 51 of Fig. 7 is representative of the sum of the voltages obtained from receiver 7a and 40 and is obtained from the output of detector 45. The line 52 is representative of the difference between the voltages obtained from the receivers 7a and 40 and is obtained from the output of phase-sensitive detector 48. Comparing Figs. 2 and 7, it will be seen that the line 51 corresponds to the graph of Fig. 2 obtained through use of a single receiver, the portion 53 obtained as the logging tool passes through rock formation 1a corresponding to the portion 26 of Fig. 2, the change in indication shown at 54 in Fig. 7 obtained as the logging tool passes between rock formation 1a and rock formation 2a corresponding to the portion 27 of Fig. 2, and the portions 55 and 56 of Fig. 7 corresponding to the portions 28 and 29 of Fig. 2. However, the line 52 of Fig. 7 provides a clearer and more conspicuous showing of the regions of rock formations through which the logging tool travels which differ in permeability from one another. For instance, when the logging tool travels from the region surrounded by rock formation 1a into the region surrounded by rock formation 2a, the line 51 shows a portion 54 of changing amplitude. Corresponding to this portion 54 of line 51, a relatively sharp peak 57 is obtained on line 52. This peak is obviously more conspicuous than the changing level of the line 51 and clearly and accurately points out the region of the rock formations in which the permeability of the formations change. The peak 58 is also indicative of a change in permeability. However, it will be noted that the peaks 57 and 58 are in opposite directions from the datum line. This effect is obtained by the use of different polarity output voltages from the phase-sensitive detector 48 and indicates which output of receivers 7a and 40 is the larger in amplitude. The peak 57 at the left-hand side of the average level of the line 52 indicated by the dashed line 59 shows that the output of the receiver 7a is greater than the output of receiver 40, while the peak 58 at the right-hand side of datum level 59 shows that the output of receiver 40 is greater than the output of the receiver 7a. The line or graph 52 thus not only gives a clear and conspicuous indication of the location of changing permeability, but also indicates in which direction the permeability is changing, that is, whether the tool is going from a formation of high permeability into one of low permeability, or vice versa. Since the travel of the chart is related to the movement of the logging tool, the depth of areas of changing permeability, as well as the depth of areas of any selected permeability can readily be determined.

In this novel arrangement all unwanted signals are cancelled in the difference amplifier and phase-sensitive detector, which does not respond to noise or the quadrature component in either signal. Sharp filters of similar design may be used in both the sum amplifier 44 and the difference amplifier 47 without phasing difficulties, as the phase of the reference voltage is derived from the measured signals.

Though the apparatus of Fig. 6 provides a very good indication of the permeability of the formations through which the logging tool travels and clear indications of changing permeability of rock formations, the apparatus is subject to one disadvantage noted heretofore in connection with the apparatus of Fig. 1. That is, since the line 51 of Fig. 7 indicates the sum of the voltages obtained from the two receivers 7a and 40, it is fairly difficult to see on that line small changes in the voltage which may indicate changing permeability. It is necessary to bias the recording head responsive to the sum of the receiver voltages to prevent the graph it makes from wandering off the chart of the recorder. Accordingly, the apparatus of Fig. 8 has been designed as a modification of a portion of the apparatus of Fig. 6 to provide a datum or comparison voltage for the recording head which is responsive to the sum of the voltages obtained from the two receivers.

Most of the elements shown in Fig. 8 are identical with the corresponding elements of Fig. 6 and so are identified with the same numerals, primed. Consequently, these elements will not be further discussed in connection with Fig. 8. However, the output voltage of limiter 49' of Fig. 8, or the reference voltage, is also supplied to a potentiometer 60, as well as to the transformer 50' of the phase-sensitive detector 48'. A tap 61 on the potentiometer 60 selects a portion of the voltage across the potentiometer and supplies it to a difference amplifier 62. The voltage selected by potentiometer tap 61 may be termed a comparison voltage. The output of the summing amplifier 44' is also supplied to the difference amplifier 62, and the latter amplifier provides an output voltage representative of the difference between the sum of the voltages obtained from the two receivers and the comparison voltage selected by the potentiometer tap 61. The tapped potentiometer hence provides a datum level for the difference amplifier 62, and the output of the difference amplifier is representative of the excursions of the sum of the voltages from the two receivers from the datum level selected. The voltage output of the difference amplifier 62 is supplied to a phase-sensitive detector 63, and a voltage obtained from the limiter 49', a reference voltage, is also supplied to the phase-sensitive detector through the medium of a transformer 64. The phase-sensitive detector 63 provides an output having an amplitude representative of the difference between the sum voltage obtained from the two receivers and the comparison voltage obtained from potentiometer tap 61. The polarity of the voltage obtained from the phase-sensitive detector is dependent upon the relative phase of the reference voltage with respect to the difference voltage. The outputs from the phase-sensitive detector 63 and the phase-sensitive detector 48' are supplied to the two recording heads of the D.-C. recorder 46'. The difference amplifier 62 and the phase-sensitive detector 63 of Fig. 8 are of conventional and well-known construction, and since their specific constructions are not parts of the present invention, they will not be described in detail.

Figure 9:
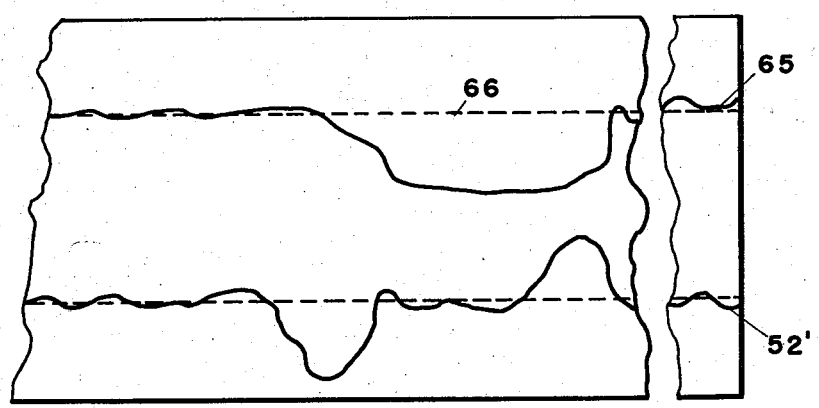
Fig. 9 is an illustration of a graph which would be obtained with the apparatus of Fig. 8.

The operation of the apparatus of Fig. 6, as modified in accordance with Fig. 8, can be seen from the graph of Fig. 9. The line 52' of Fig. 9 corresponds to the line 52 of Fig. 7 and indicates clearly the differences in permeability of the formations through which the logging tool travels. The line 65 of Fig. 9 corresponds to the line 51 of Fig. 7, but it is provided with a datum level as shown as dashed at 66. It will be noted that graph 65 of Fig. 9 indicates only the differences between the comparison voltage and the sum of the voltages obtained from the two receivers 7a and 40 of Fig. 6, and which of the sum voltage and the comparison voltage is the larger may be readily ascertained by reference to Fig. 9, since when the sum voltage is larger the graph 65 is above datum level 66, and when the sum voltage is smaller the line 65 is below the datum.

It is evident that the primary function of the limiter in each circuit is to provide a constant reference voltage whose phase is controlled by the received signals. An oscillator with its phase controlled by the received signals may be used. Band pass filters adjusted to the emitter frequency may preferably be used in each of the A.C. amplifiers including the summing and difference amplifiers.

It will be evident that the logging tool may also carry electrodes for measuring self-potential or resistivity by well known methods and that these measurements may be correlated with impedance measurements obtained with the apparatus of this invention. For instance, an indication of decreased impedance (higher permeability), coupled with an indication of high resistivity, would indicate the likelihood of the presence of oil or gas-bearing formations.

It will also be evident that a plurality of detectors or transducers could be provided at each receiving station and the detectors at an individual receiving station paralleled.

Preferred embodiments of the apparatus of the present invention have been described in conjunction with the accompanying drawings. However, it is obvious that many minor changes could be made in the specific apparatus disclosed without departure from the spirit and scope of the present invention. The scope of the invention, accordingly, is defined only by the appended claims.

I claim:

1. The method of well logging which includes the steps of generating at a source within a liquid-containing borehole periodic volumetric pulsations which cause pressure fluctuations in the liquid adjacent the source, the pressure fluctuations being continuously related to the acoustical properties of the formations traversed by the borehole in a region near the source and to the amplitude and frequency of the volumetric pulsations, maintaining the amplitude and frequency of the volumetric pulsations constant and the frequency of such magnitude that a quarter wavelength of the pulsations is larger than the diameter of the borehole, detecting the magnitude of the pressure pulsations in the liquid at each of a pair of positions at opposite sides of the source, said positions being physically displaced from the source but at a distance from the source of less than a quarter wavelength of the pulsations, comparing the detections obtained at the pair of positions to obtain a difference signal, and indicating the difference signal, whereby a quantity indicative of differing acoustical properties of the formations adjacent the pair of positions is obtained.

2. The method of well logging which includes the steps of generating at a source within a liquid-containing borehole periodic volumetric pulsations which cause pressure fluctuations in the liquid adjacent the source, the pressure fluctuations being continuously related to the acoustical properties of the formations traversed by the borehole in a region near the source and to the amplitude and frequency of the volumetric pulsations, maintaining the amplitude and frequency of the volumetric pulsations constant and the frequency of such magnitude that a quarter wavelength of the pulsations is larger than the borehole diameter, converting resulting fluctuating pressures at each of a pair of positions located at opposite sides of the source into corresponding signal voltages, said positions being physically displaced from the source but at a distance from the source of less than a quarter wavelength of the pulsations, comparing the signal voltages from the two positions to obtain a difference voltage, and recording said difference voltage on a moving chart, the translation of said chart being a function of the position of the source in the borehole.

3. The method of claim 2 including the step of comparing the phase of said difference voltage with a reference voltage of the same frequency as, and having its phase controlled by, the signal voltage from at least one of the positions prior to recording the difference voltage.

4. An apparatus for logging a liquid-containing borehole comprising a source of periodic volumetric pulsations of substantially constant frequency and amplitude adapted to be immersed in said liquid, a pressure-sensitive receiver for translating pressure fluctuations in the liquid caused by said volumetric pulsations into an output signal of magnitude representative of the amplitude of fluctuations impinging on the receiver, said receiver being spaced from said source a distance smaller than a quarter wavelength of the pulsations, means for supplying a comparison signal of substantially constant amplitude and having a constant frequency and phase relation to the output signal, means for comparing said output signal and said comparison signal to provide a third signal representative of the difference between the output signal and the comparison signal, and means for indicating said third signal.

5. An apparatus for logging a liquid-containing borehole comprising a source of periodic volumetric pulsations of substantially constant frequency and amplitude adapted to be immersed in said liquid, a pair of pressure-sensitive receivers positioned on opposite sides of the source for translating pressure fluctuations in the liquid caused by said volumetric pulsations into electrical output signals of magnitudes representative of the amplitudes of fluctuations impinging on the receivers, said receivers each being spaced from said source a distance smaller than a quarter wavelength of the pulsations, said source and said receivers being movable within the borehole to a plurality of positions of different vertical spacing from the ground level, a recorder having a chart movable along one of its dimensions to a plurality of positions corresponding to the positions of the source and a recording head for forming an indication on the chart at a position along a second dimension of the chart determined by the magnitude of the signals supplied the recording head, means for obtaining from the output voltages of the two receivers a second voltage representative of the difference of the two output voltages of the receivers, means for obtaining from the output voltage of at least one of the receivers a reference voltage of substantially constant amplitude having a frequency and phase of constant relation to the frequency and phase of the output voltage of said one receiver, a phase-sensitive detector, means connecting said second voltage and said reference voltage to said phase-sensitive detector, said phase-sensitive detector providing an output voltage of magnitude corresponding with said second voltage and having a phase dependent upon the relative phase of said second voltage with respect to said reference voltage, and means connecting the output of said phase-sensitive detector to the recording head.

References Cited in the file of this patent

UNITED STATES PATENTS

| | | |
|---|---|---|
| 2,191,121 | Slichter | Feb. 20, 1940 |
| 2,200,476 | Mounce | May 14, 1940 |
| 2,275,736 | Cloud | Mar. 10, 1942 |
| 2,301,458 | Salvatori | Nov. 10, 1942 |
| 2,433,746 | Doll | Dec. 30, 1947 |
| 2,530,971 | Kean | Nov. 21, 1950 |
| 2,595,241 | Goble | May 6, 1952 |
| 2,651,027 | Vogel | Sept. 1, 1953 |
| 2,694,461 | Martin | Nov. 16, 1954 |
| 2,722,282 | McDonald | Nov. 1, 1955 |

OTHER REFERENCES

Heiland: "Geophysical Exploration," published by Prentice-Hall, Inc., New York, 1946, pages 468–473.